US011025623B2

(12) United States Patent
Priyadarshini et al.

(10) Patent No.: US 11,025,623 B2
(45) Date of Patent: *Jun. 1, 2021

(54) UPDATING DATABASE DRIVERS FOR CLIENT APPLICATIONS THROUGH A DATABASE SERVER PUSH

(71) Applicant: International Business Machines Corporation, Armonk, NY (US)

(72) Inventors: Pallavi Priyadarshini, Bangalore (IN); Parameswara R. Tatini, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/684,938

(22) Filed: Nov. 15, 2019

(65) Prior Publication Data

US 2020/0084210 A1 Mar. 12, 2020

Related U.S. Application Data

(63) Continuation of application No. 16/274,457, filed on Feb. 13, 2019, now Pat. No. 10,530,773, which is a
(Continued)

(51) Int. Cl.
*H04L 29/06* (2006.01)
*H04L 29/08* (2006.01)
(Continued)

(52) U.S. Cl.
CPC ............ *H04L 63/0876* (2013.01); *G06F 8/65* (2013.01); *H04L 63/083* (2013.01); *H04L 63/10* (2013.01);
(Continued)

(58) Field of Classification Search
CPC ... H04L 63/0876; H04L 67/34; H04L 67/141; H04L 63/083; H04L 63/10; G06F 8/65; G06F 9/4411
See application file for complete search history.

(56) References Cited

U.S. PATENT DOCUMENTS 7,020,696 B1 3/2006 Perry
7,051,097 B1 5/2006 Pecina
(Continued)

FOREIGN PATENT DOCUMENTS

WO 9850861 A1 11/1998

OTHER PUBLICATIONS

IBM: List of IBM Patents or Patent Applications Treated as Related (Appendix P), Mar. 10, 2020, pp. 1-2.
(Continued)

*Primary Examiner* — Jospeh P Hirl
*Assistant Examiner* — Thomas A Gyorfi
(74) *Attorney, Agent, or Firm* — Michael O'Keefe

(57) ABSTRACT

A method for updating drivers. The method may include transmitting a connection request from a first computer to a second computer. The method may include creating a connection handshake in the first computer in response to the transmitted connection request, whereby the connection handshake includes client credentials and driver information. The method may include transmitting the created connection handshake from the first computer to a second computer. The method may include determining the first computer is authorized to connect to the second computer based on the client credentials. The method may include determining a first version level of a first plurality of drivers associated with the first computer is a lower version level than a second version level of a second plurality of drivers associated with the second computer based on the driver
(Continued)

information. The method may include transmitting a driver update. The method may include installing the driver update.

20 Claims, 6 Drawing Sheets

Related U.S. Application Data continuation of application No. 14/810,222, filed on Jul. 27, 2015, now Pat. No. 10,250,600.

(51) Int. Cl.
  *G06F 8/65*   (2018.01)
  *G06F 9/4401*   (2018.01)
(52) U.S. Cl.
  CPC ............ *H04L 67/141* (2013.01); *H04L 67/34* (2013.01); *G06F 9/4411* (2013.01)

(56) References Cited

U.S. PATENT DOCUMENTS

| | | | |
|---|---|---|---|
| 7,225,240 | B1 | 5/2007 | Fox |
| 7,240,364 | B1 | 7/2007 | Branscomb |
| 7,266,595 | B1 | 9/2007 | Black |
| 7,715,027 | B2 | 5/2010 | Ferlitsch |
| 8,341,621 | B2 | 12/2012 | Brockway |
| 8,429,642 | B1 | 4/2013 | Cheng |
| 8,560,694 | B2 | 10/2013 | Keller |
| 8,978,044 | B2 | 3/2015 | Coronado |
| 9,081,747 | B1 | 7/2015 | Tabieros |
| 10,530,773 | B2 * | 1/2020 | Priyadarshini .......... H04L 63/10 |
| 2002/0138567 | A1 | 9/2002 | Ogawa |
| 2004/0181787 | A1 | 9/2004 | Wickham |
| 2005/0132348 | A1 | 6/2005 | Meulemans |
| 2005/0132349 | A1 | 6/2005 | Roberts |
| 2005/0257218 | A1 | 11/2005 | Lin |
| 2008/0201726 | A1 | 8/2008 | Nagashima |
| 2010/0175061 | A1 | 7/2010 | Maeda |
| 2012/0036504 | A1 | 2/2012 | Masters |
| 2014/0108868 | A1 | 4/2014 | Neerincx |
| 2017/0031673 | A1 | 2/2017 | Priyadarshini |
| 2017/0034163 | A1 | 2/2017 | Priyadarshini |
| 2017/0039060 | A1 | 2/2017 | Brusky |
| 2019/0182246 | A1 | 6/2019 | Priyadarshini |

OTHER PUBLICATIONS

Cecchet et al., "Drivolution: Rethinking the Database Driver Lifecycle," 1oth ACM/IFIP/USENIX International Middleware Conference, Industrial Track, Dec. 2009, p. 1-10, Urbana-Champaign, IL.

JD List et al., "How to upgrade my database driver on my OAS server," JD Edwards® EnterpriseOne Technical Forum, Jun. 2, 2012, p. 1-2, vBulletin Solutions, Inc., http://www.jdelisl.com/vb4/show1hread.php/45213-How-to-upgrade-my-database-driver-on-my-OAS-server, Accessed on Jul. 8, 2015.

Mell et al., "The NIST Definition of Cloud Computing," National Institute of Standards and Technology, Sep. 2011, p. 1-3, Special Publication 800-145.

Oracle, "Smart Upgrade Support for JDBC," Oracle® Fusion Middleware Administering JDBC Data Sources for Oracle WebLogic Server, p. 1-2, https://docs.oracle.com/middleware/1213/wls/JDBCA/smart_upgrade.htm#JDBCA687, Accessed on Jul. 8, 2015.

Simba, "Custom Connections," Simba Technologies Data Connections, p. 1-2, Simba Technologies Inc., http://www.simba.com/data-connections/custom-connections, Accessed on Jul. 8, 2015.

* cited by examiner

UPDATING DATABASE DRIVERS FOR CLIENT APPLICATIONS THROUGH A DATABASE SERVER PUSH

FIELD OF INVENTION

The present invention relates generally to the field of computing, and more particularly to database drivers.

BACKGROUND

In computing, drivers relate to software that allows a computer to communicate with hardware and other devices. A database driver may be software that connects a high level application programing interface (API), such as Java Database Connectivity (JDBC) and Open Database Connectivity (ODBC), to low level database server protocols, such as Distributed Relational Database Architecture (DRDA). Similar to many software programs, driver performance and functionality may be improved through an upgrade process that replaces one version of the driver with a new or better version of the driver.

SUMMARY

According to one embodiment, a method for updating drivers is presented. The method may include transmitting a connection request from a first computer to a second computer. The method may also include creating a connection handshake in the first computer in response to the transmitted connection request, whereby the connection handshake includes a plurality of client credentials and a plurality of driver information. The method may further include transmitting the created connection handshake from the first computer to a second computer. The method may also include determining the first computer is authorized to connect to the second computer based on the plurality of client credentials. The method may further include determining a first version level of a first plurality of drivers associated with the first computer is a lower version level than a second version level of a second plurality of drivers associated with the second computer based on the plurality of driver information. The method may also include transmitting a driver update. The method may further include installing the driver update.

According to another embodiment, a computer system for updating drivers is presented. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The computer system may include transmitting a connection request from a first computer to a second computer. The computer system may also include creating a connection handshake in the first computer in response to the transmitted connection request, whereby the connection handshake includes a plurality of client credentials and a plurality of driver information. The computer system may further include transmitting the created connection handshake from the first computer to a second computer. The computer system may also include determining the first computer is authorized to connect to the second computer based on the plurality of client credentials. The computer system may further include determining a first version level of a first plurality of drivers associated with the first computer is a lower version level than a second version level of a second plurality of drivers associated with the second computer based on the plurality of driver information. The computer system may also include transmitting a driver update. The computer system may further include installing the driver update.

According to yet another embodiment, a computer program product for updating drivers is presented. The computer program product may include one or more computer-readable storage devices and program instructions stored on at least one of the one or me tangible storage devices, the program instructions executable by a processor. The computer program product may include program instructions to transmit a connection request from a first computer to a second computer. The computer program product may also include program instructions to create a connection handshake in the first computer in response to the transmitted connection request, whereby the connection handshake includes a plurality of client credentials and a plurality of driver information. The computer program product may further include program instructions to transmit the created connection handshake from the first computer to a second computer. The computer program product may also include program instructions to determine the first computer is authorized to connect to the second computer based on the plurality of client credentials. The computer program product may also include program instructions to determine a first version level of a first plurality of drivers associated with the first computer is a lower version level than a second version level of a second plurality of drivers associated with the second computer based on the plurality of driver information. The computer program product may also include program instructions to transmit a driver update. The computer program product may further include program instructions to install the driver update.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Figure 1:
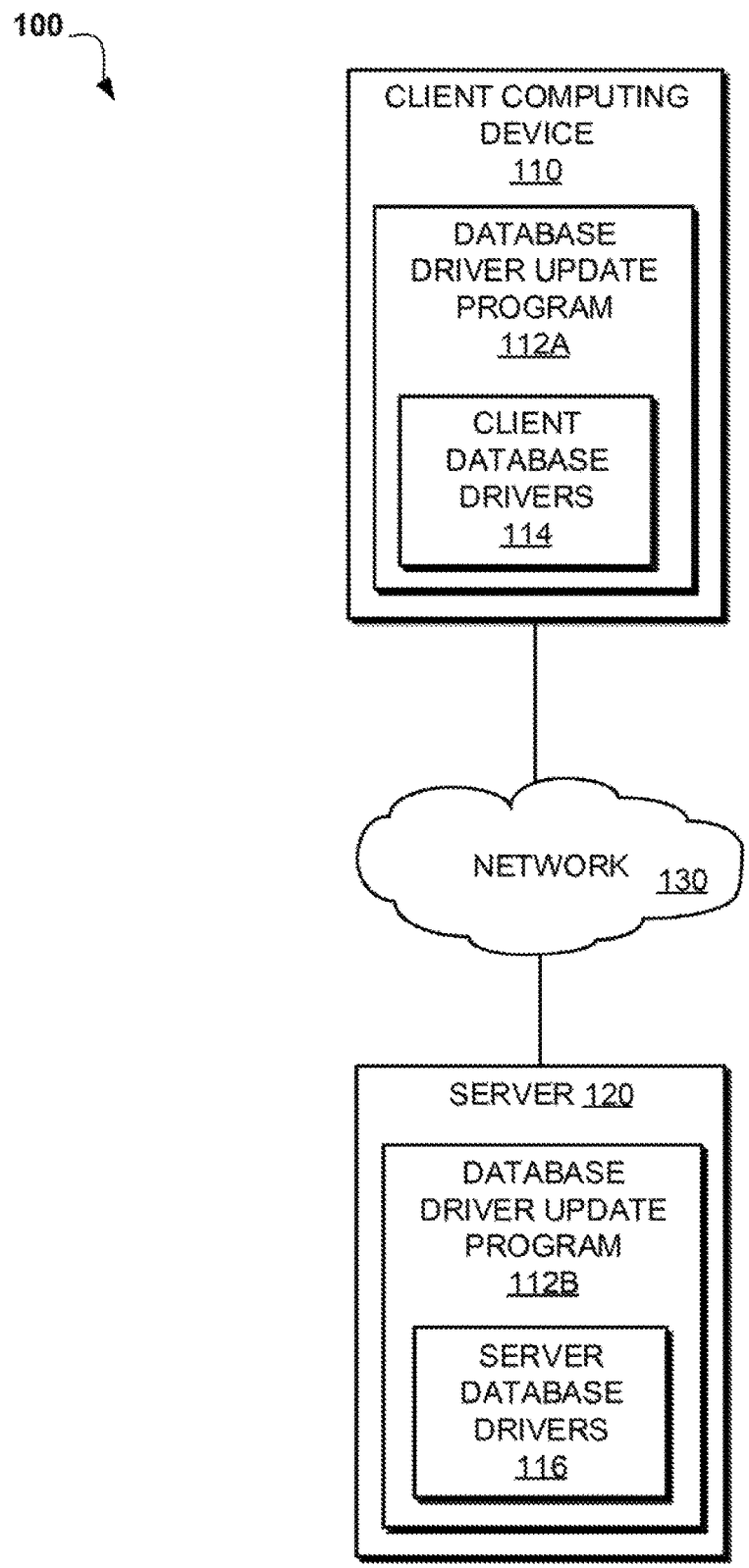
FIG. 1 is an exemplary networked computer environment, in accordance with one embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to database drivers. The following described exemplary embodiments provide a system, method, and program product to, among other things, push database drivers from a server to a client computer whenever a version mismatch is detected. Therefore, the present embodiment has the capacity to improve the technical field of database drivers by allowing a client device operating under a previous driver version to automatically receive and update installed database drivers to match the driver version installed on a database server to which the client device is connected.

As previously described, drivers relate to software that allows a computer to communicate with hardware and other devices. A database driver may be software that connects a high level application programing interface (API), such as Java Database Connectivity (JDBC) and Open Database Connectivity (ODBC), to low level database server protocols, such as Distributed Relational Database Architecture (DRDA). Similar to many software programs, driver performance and functionality may be improved through an upgrade process that replaces one version of the driver with a new or better version of the driver.

Typically, updating database drivers on a client device is a manual task. Whenever database vendors release new versions of the database driver, all client applications and devices that connected to the database server using database drivers may need to install the new driver version in order to be compatible with the database server. For example, for a system utilizing an IBM DB2® (IBM DB2 and all IBM DB2-based trademarks and logos are trademarks or registered trademarks of International Business Machines Corporation and/or its affiliates) server, a Java application may need to use IBM Data Server Driver for JDBC and SQLJ in order to connect to the server. If the server is upgraded to build in new features, the database drivers may need to be updated to a matching level to allow support for the new server features.

Upgrading database drivers throughout an enterprise network may be burdensome since client applications may be installed on many client devices. Furthermore, manually updating drivers across potentially hundreds or thousands of client devices may present significant overhead. If a user chooses to forgo upgrading drivers due to the overhead burden presented by the upgrade process, the user may risk operation errors due to the level mismatch between the client and server versions of the drivers. Additionally, client applications that utilize the drivers may not be capable of exploiting new features made available on the database server since such features may not exist in earlier driver versions. For example, if a server adds support for stored procedure invocation with array parameters, the same support for this feature may be required in the driver via a new driver version. If a user does not upgrade the client-installed drivers to the latest version, the client application may not be able to leverage stored procedures with arrays despite the server capability to do so.

Furthermore, server and client upgrades may require coordination across an enterprise between different departments. For some client application systems, such as automated teller machines (ATMs), obtaining the latest versions of database drivers may be essential since critical fixes may be included in the latest driver versions. As such, it may be advantageous, among other things, to implement a system that allows automatic push distribution of the latest driver versions from a server to a client device when the client device connects to the server.

According to one embodiment, a mechanism may be introduced that allows a database server to push the latest version of database drivers to the client application when a connection request is received by a database server from a client application operating with a different driver version than the database server. A client application may open a connection with a database server using an existing database connectivity API, such as JDBC. Once a connection is established, the client device-installed database driver may send a connection handshake to the database server containing connection details, such as driver version, user identification, and password, using a communication protocol understood by the database server. The database server may then validate the attributes within communication details. If the communication details are successfully validated, the database server may compare the client device-installed driver version with the server-installed driver version. If the driver version of the client device-installed driver and the server-installed driver do not match, the server may send the appropriate driver version to the client device and disconnect from the client device. When the client application receives a reply from the database server containing a database driver update, the client application may update the client device-installed driver version with that received from the server and reconnect to the database server using the updated driver version.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to push database drivers from a server to a client computer whenever a version mismatch is detected. According to at least one implementation, the present embodiment may determine the driver versions installed on a client device and a server when a connection between the client device and the server is first established. If the drive versions on the client device and the server are not the same, the server may send a drive update to a client application on the client device so that the client application may update the database drivers to match the drivers on the server.

Referring to FIG. 1, an exemplary networked computer environment 100 is depicted, in accordance with one embodiment. The networked computer environment 100 may include client computing device 110 and server 120 interconnected via communication network 130. According to at least one implementation, networked computer environment 100 may include a plurality of client computing devices 110 and server 120, only one of each being shown for illustrative brevity.

Communication network 130 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 110 may be, for example, a mobile device, a telephone, a personal digital assistant, a netbook, a laptop computer, a tablet computer, a desktop computer, or any type of computing device capable of running a program and accessing a network. Client computing device 110 may be capable of hosting database driver update program 112A, 112B, client database drivers 114, and communicating with server 120 via network 130, in accordance with one embodiment of the invention. As will be discussed with reference to FIG. 4, client computing device 110 may include internal components 402a and external components 404a, respectively.

Server computer 120, or database server, may be a laptop computer, netbook computer, personal computer (PC), a desktop computer, or any programmable electronic device capable of hosting database driver update program 112A, 112B, server database drivers 116, and communicating with client computing device 110 via network 130, in accordance with embodiments of the invention. As will be discussed with reference to FIG. 4, server computer 120 may include internal components 402b and external components 404b, respectively. Server 120 may also operate in a cloud computing service model, such as Software as a Service (SaaS), Platform as a Service (PaaS), or Infrastructure as a Service (IaaS). Server 120 may also be located in a cloud computing deployment model, such as a private cloud, community cloud, public cloud, or hybrid cloud.

According to the present embodiment, client database drivers 114 and server database drivers 116 may each be a program capable of implementing a protocol, such as ODBC and JDBC, for connecting to and interact with a database. Client database drivers 114 may be located on client device 110. Server database drivers 116 may be located on server 120.

Database driver update program 112A, 112B, may be a program capable of connecting client computing device 110 with database server 120 and updating client database drivers 114 when client database drivers are a down level version of server database drivers 116 are not the same driver version. Database driver update program 112A, 112B may include client database drivers 114 and server database drivers 116. Database driver update program 112A, 112B is explained in further detail below with respect to FIG. 2.

Figure 2:
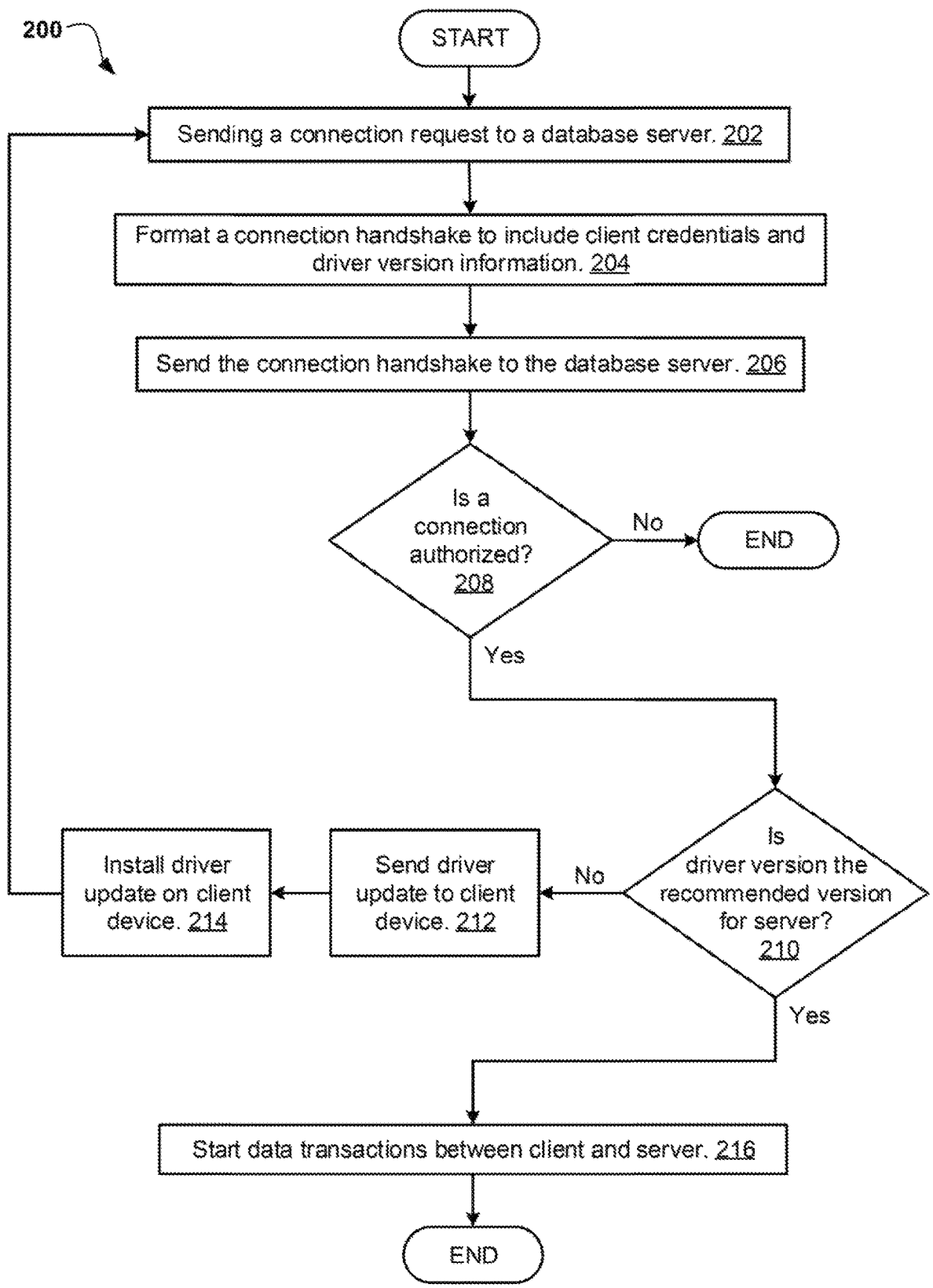
FIG. 2 illustrates a flowchart of the operational steps carried out by a program to update database drivers, in accordance with one embodiment of the present invention.

Referring now to FIG. 2, a flowchart 200 of the operational steps carried out by a program to update database drivers is depicted, in accordance with one embodiment of the present invention. At 202, database driver update program 112A, 112B may send a connection request to establish a connection between client computing device 110 and the server 120. When client computing device 110 hosting client database drivers 114 wishes to access database server 120, a connection request may first be sent requesting authorization to establish a connection between client computing device 110 and database server 120. For example, if a client application installed on client computing device 110 wishes to access a database on database server 120, a connection request may first be sent and approved before a connection between client computing device 110 and database server 120 is permitted and the client application is allowed access to the database.

Then at 204, database driver update program 112A on client computing device 110 may format a connection handshake. Once a connection between client computing device 110 and database server 120 is established, database driver update program 112A may create a connection handshake in order to send client credentials and driver information to database server 120. In computing, handshaking may be a negotiation process between two entities within a connection that set the parameters of the connection before normal communication begins over the channel. For example, when client computing device 110 and database server 120 first establish a connection, a handshake may take place so that database server 120 can identify client computing device 110 and the driver version of client database drivers 114. Furthermore, the client credentials within the connection handshake may include a user identification (ID) name or number, a user password, a user internet protocol (IP) address, and a device identification name or number. Additionally, the driver information within the connection handshake may include the driver type, such as DRDA, and the driver version of client database drivers 114.

Next at 206, database driver update program 112A may send the formatted connection handshake to the database server. Once database driver update program 112A has created the connection handshake, the connection handshake may be sent from database driver update program 112A hosted on client computing device 110 to database driver update program 112B hosted on database server 120.

Then at 208, database driver update program 112B may determine if a connection between client device 110 and database server 120 is authorized based on the client credentials within the connection handshake. According to one implementation, the method may continue along operational flowchart 200, if a connection between client computing device 110 and database server 120 is authorized based on the client credentials. If database driver update program 112B determines client computing device 110 is authorized to establish a connection with database server 120 (step 208, "YES" branch), database driver update program 112B may continue to step 210 to determine if client database drivers 114 and server database drivers 116 are the same version. If database driver update program 112B determines client computing device 110 is not authorized to establish a connection with database server 120 (step 208, "NO" branch), database driver update program 112B may disconnect client computing device 110 and database server 120 and the method may terminate.

Database driver update program 112B may determine whether a connection between client computing device 110 and database server 120 is authorized by reviewing the client credentials, such as user ID, password, and IP address, within the connection handshake. Furthermore, database driver update program 112B may contain information necessary to determine whether a user or client device is authorized to connect to database server 120.

Next at 210, if database driver update program 112B determines client computing device is authorized to connect to database server 120, database driver update program 112B may then determine if the driver version of client database drivers 114 is the recommended driver version. According to one implementation, the method may continue along operational flowchart 200, if the driver version of client database drivers 114 is the recommended driver version. If database driver update program 112B determines the driver version of client database drivers 114 is the recommended driver version (step 210, "YES" branch), database driver update program 112B may continue to step 216 to start a data transaction between client computing device 110 and server 120. If database driver update program 112B determines the driver version of client database drivers 114 is not the recommended driver version (step 210, "NO" branch), database driver update program 112B may continue to step 212 to send a driver update for client database drivers 114.

Then at 212, database driver update program 112B may deliver a driver update packet as a data payload to a preconfigured location on client computing device 110. If database driver update program 112B determines client database drivers 114 and server database driver 116 are not the same version, a driver update may be sent in the connection request reply from database driver update program 112B on database server 120 to database driver update program 112A hosted on client computing device 110 so that client database drivers 114 may be updated to the same version as server database drivers 116. For example, if database driver update program 112B determines version three of client database drivers 114 are operating on client computing device 110 and version four of server database drivers 116 are operating on database server 120, database driver update program 112B may send version four of client database drivers 114 to database driver update program 112A so that client database drivers 114 may be upgraded to the same version level as server database drivers 116. Additionally, the driver update packet may be sent to client computing device 110 as a byte array using the database protocol, such as DRDA, operating on database server 120. Furthermore, once database driver update program 112B sends the driver update packet to database driver update program 112A on client computing device 110, database driver update program 112B may deny the connection request from database driver update program 112A between client computing device 110 and database server 120.

Next at 214, database driver update program 112A may install the received driver update packet for client database drivers 114. Once a database driver update program 112A determines a driver update packet has been delivered to the preconfigured location on client computing device 110, database driver update program 112A may convert the driver update packet to a .jar or .dll file extension depending on the database connectivity API implemented by client database drivers 114 and server database drivers 116. Database driver update program 112A may then store converted driver packet in a preconfigured path. The existing version of client database drivers 114 may then return structured query language (SQL) code to database driver update program 112A to indicate that a new driver version of client database drivers 114 has been made available by database server 120. Database driver update program 112A may then install the driver update packet so client database drivers 114 are at the same version level as server database drivers 116. Once client database drivers 114 are updated, database driver update program 112A may send a new connection request to database server 120 and format and send a new connection handshake to database driver update program 112B on database server 120.

At 216, if database driver update program 112B determines client database drivers 114 and server database drivers 116 are the same version, database driver update program 112A, 112B may confirm the new connection request and allow data transactions between client computing device 110 and server 120. Data transactions may have a time dimension, a numerical value, and refer to one or more reference data objects. If client database drivers 114 and server database drivers 116 are the same version, client computing device 110 and database server 120 may operate at full functionality allowable under the version level.

Figure 3:
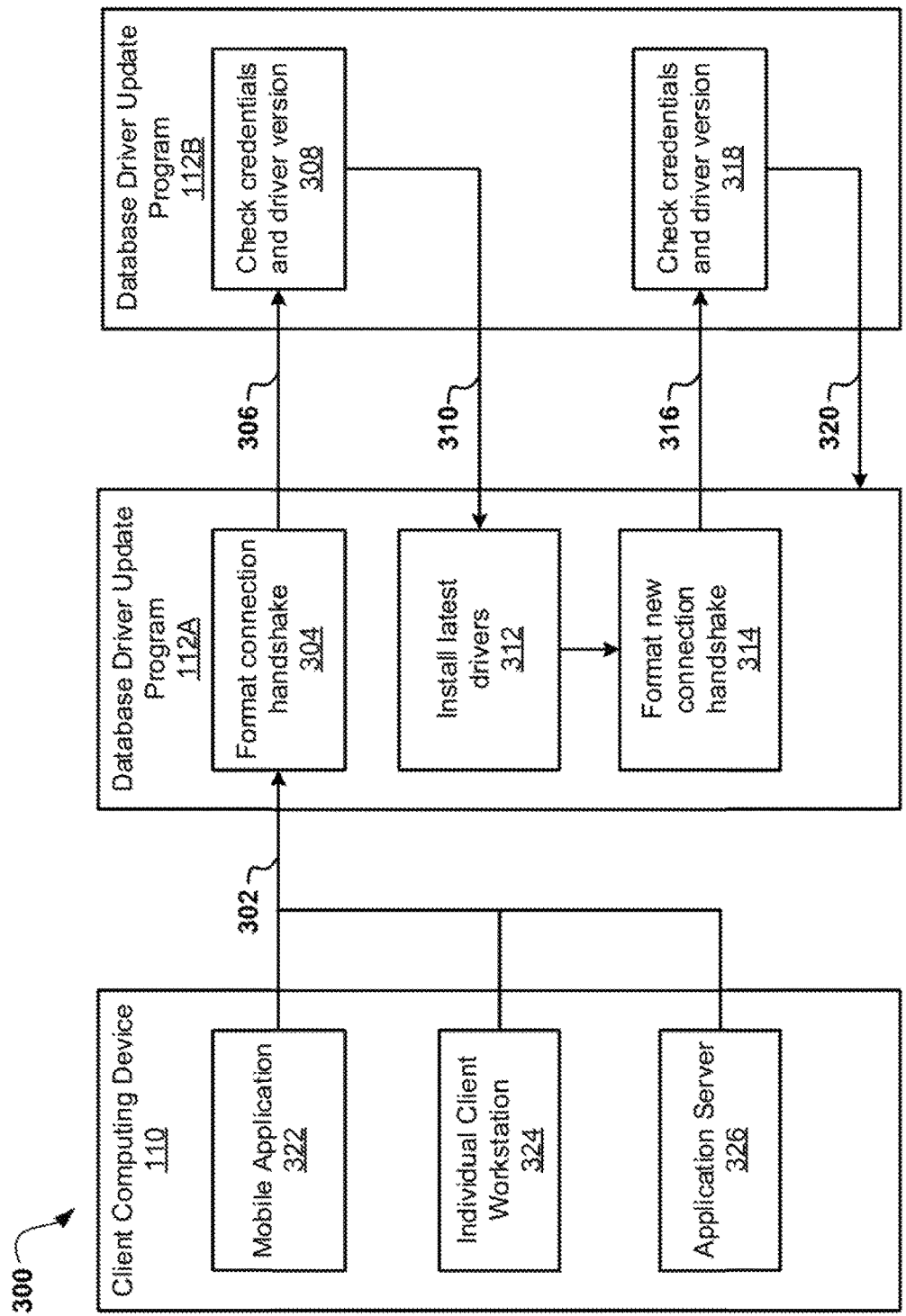
FIG. 3 is a functional block diagram of the steps implemented by a database driver update program, in accordance with one embodiment of the present invention.

Referring now to FIG. 3, a functional block diagram 300 of the steps implemented by a database driver update program is depicted, in accordance with one embodiment of the present invention. At 302, a client computing device 110, such as mobile application 322, individual client workstation 324, and application server 326, may begin a connection request with database server 120. At 304, database driver update program 112A may format a connection handshake that include client credentials, such as user ID, password, and IP address, and driver information, such as version of client database drivers 114. At 306, database driver update program 112A may send the connection handshake to database driver update program 112B in database server 120. At 308, database driver update program 112B may validate the client credentials and check the driver version of client database drivers 114 to ensure client database drivers 114 are the same version as server database drivers 116. At 310, database driver update program 112B may send a driver update packet to database driver update program 112A when client database drivers 114 are at a lower version level than server database drivers 116. At 312, database driver update program 112A may install the received driver update packet so that client database drivers 114 are of the same version level as server database drivers 116. At 314, database driver update program 112A may send a new connection request to database driver update program 112B and format a new connection handshake containing updated client credentials and updated driver information. At 316, database driver update program 112A may send the updated connection handshake to database driver update program 112B. At 318, database driver update program 112B may validate the updated client credentials in the new connection handshake and determine that client database drivers 114 are at the same version level as server database drivers 116. At 320, since client database drivers 114 and server database drivers 116 are at the same version level, database driver update program 112B may confirm the connection request and allow data transactions to occur between client computing device 110 and database server 120.

Figure 4:
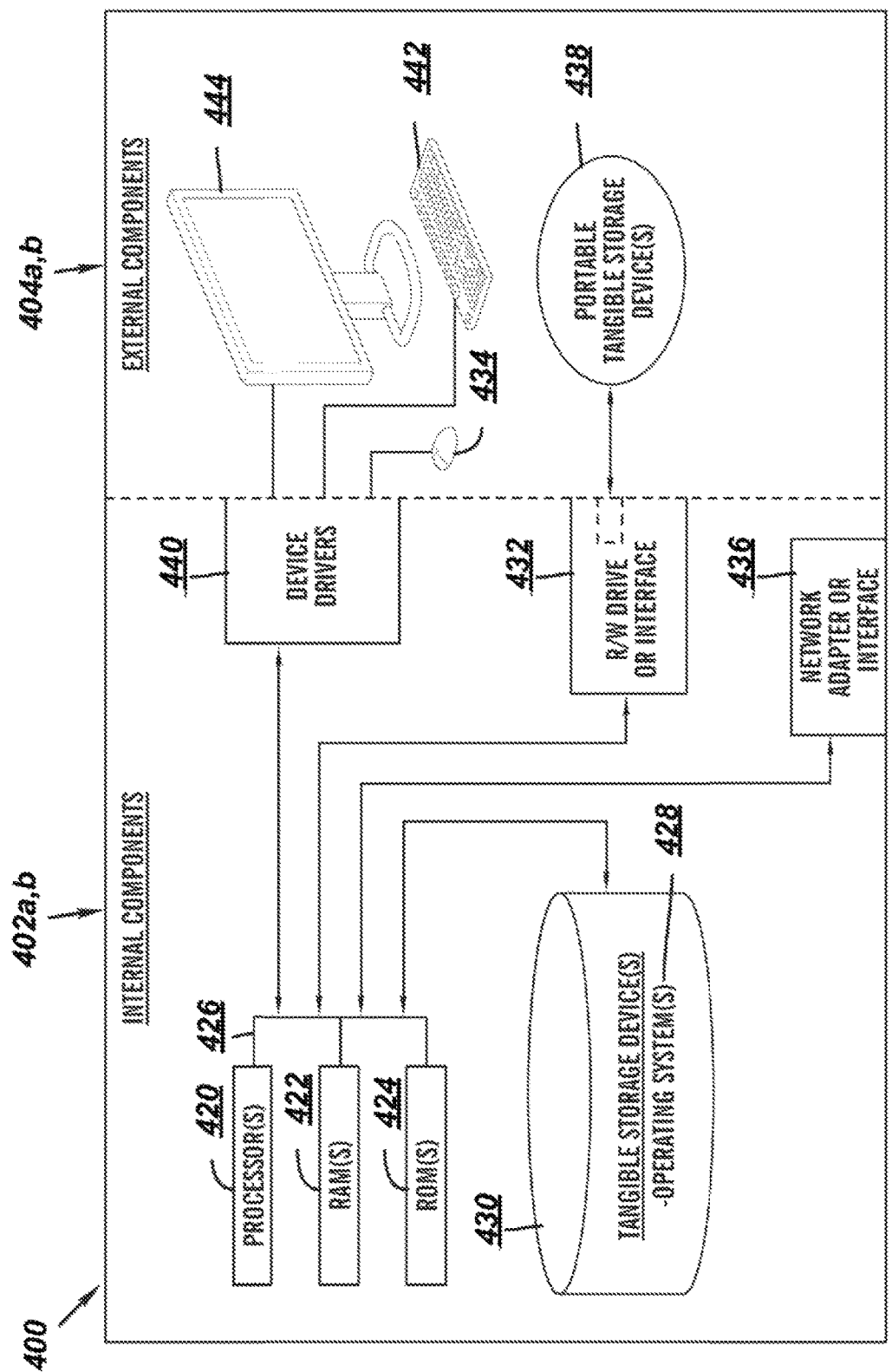
FIG. 4 depicts a cloud computing node according to an embodiment of the present invention.

FIG. 4 is a block diagram 400 of internal and external components of computer 110 and server 120 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 402, 404 is representative of any electronic device capable of executing machine-readable program instructions. Data processing system 402, 404 may be representative of a smart phone, a computer system, PDA, or other electronic devices. Examples of computing systems, environments, and/or configurations that may be represented by data processing system 402, 404 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 110 and network server 120 may include respective sets of internal components 402 a,b and external components 404 a,b illustrated in FIG. 4. Each of the sets of internal components 402 include one or more processors 420, one or more computer-readable RAMs 422 and one or more computer-readable ROMs 424 on one or more buses 426, and one or more operating systems 428 and one or more computer-readable tangible storage devices 430. The one or more operating systems 428, database driver update program 112A, and client database drivers 114 in client computer 110; and database driver update program 112B and server database drivers 116 in network server 120 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as database driver update program 112A, 112B, client database drivers 114, and server database drivers 116 can be stored on one or more of the respective portable computer-readable tangible storage devices 438, read via the respective R/W drive or interface 432 and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. Database driver update program 112A and client database drivers 114 in client computer 110 and database driver update program 112B and server database drivers 116 in network server 120 can be downloaded to client computer 110 and network server 120 from an external computer via a network (for example, the Internet, a local area network or other, wide area network) and respective network adapters or interfaces 436. From the network adapters or interfaces 436, database driver update program 112A and client database drivers 114 in client computer 110 and database driver update program 112B and server database drivers 116 in network server 120 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432 and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics Are As Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
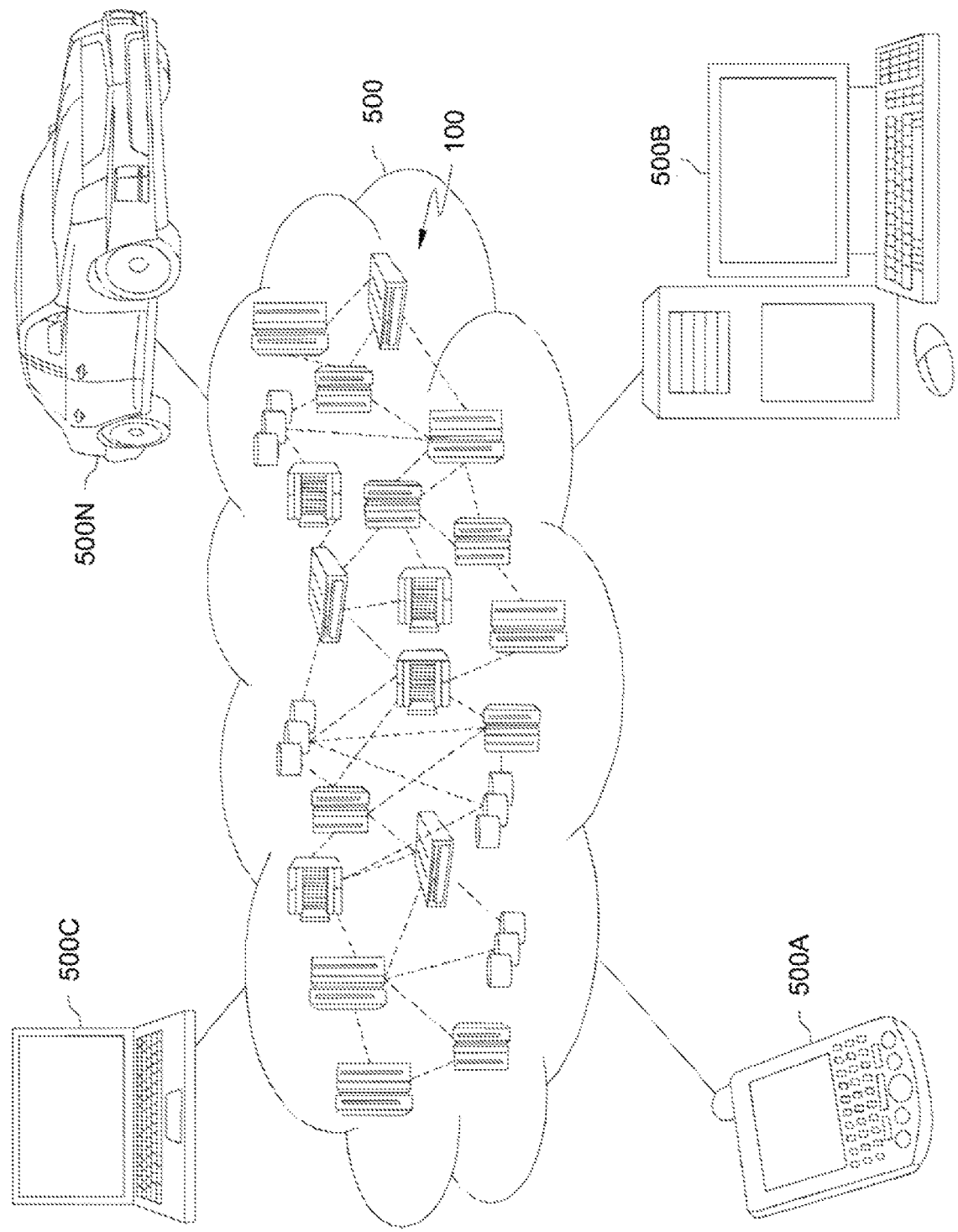
FIG. 5 depicts a cloud computing environment according to an embodiment of the present invention.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
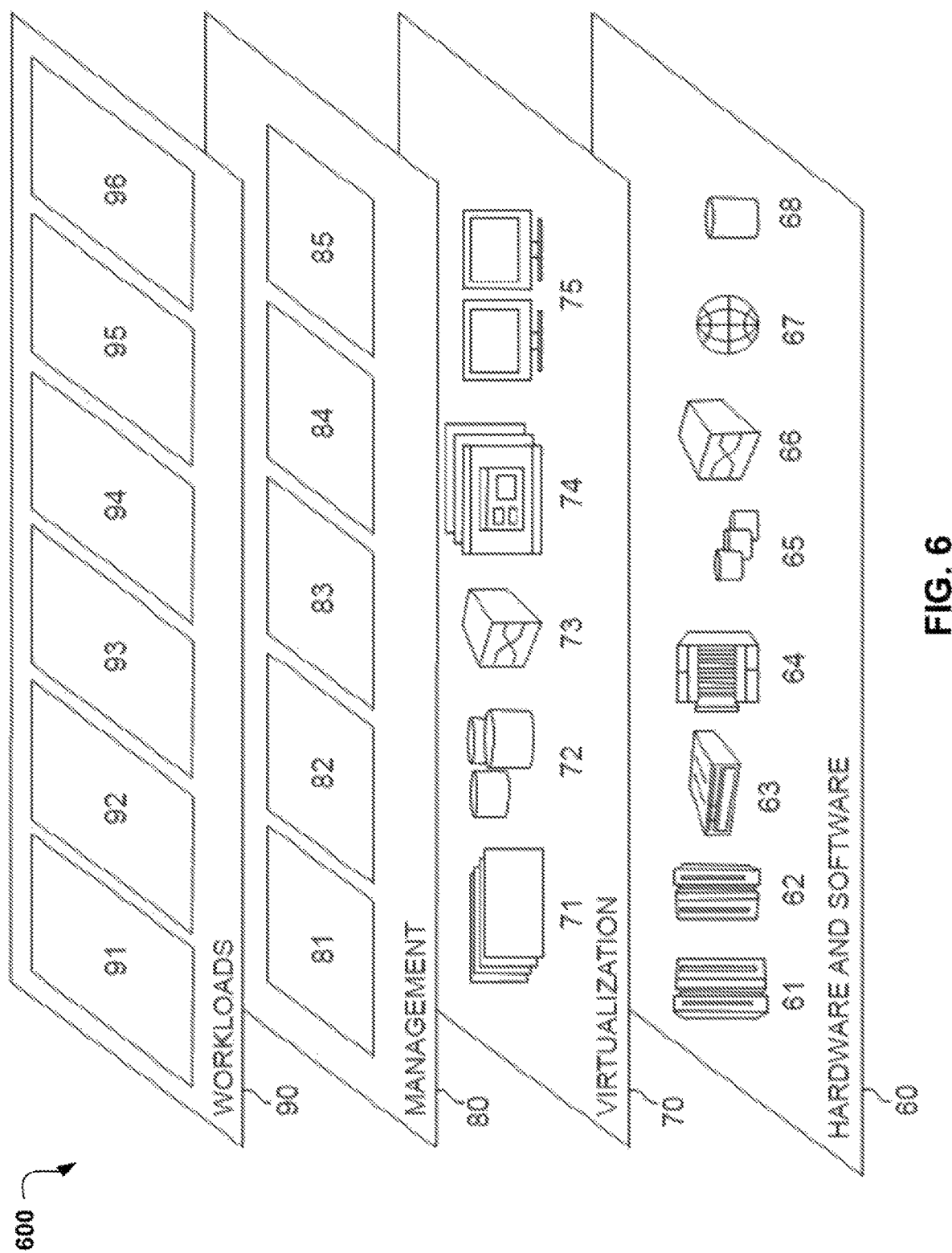
FIG. 6 depicts abstraction model layers according to an embodiment of the present invention.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and updating database drivers 96. Updating database drivers may be implemented by pushing a driver upgrade from a database server to a client application on a client computing device when the client-installed database drivers differ in version from the server-installed database drivers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for updating drivers, the method comprising:
   creating a connection handshake in a first computer in response to a connection request, wherein the connection handshake includes a plurality of client credentials and a plurality of driver information;
   in response to determining the first computer is authorized to connect to a second computer based on the plurality of client credentials, comparing, by the second computer, a first version level of a first plurality of drivers associated with the first computer to a second version level of a second plurality of drivers associated with the second computer based on the plurality of driver information; and
   transmitting a driver update from the second computer to the first computer as a byte array using a database protocol operating on the second computer regardless of whether the driver update is necessary.

2. The method of claim 1, wherein the plurality of client credentials includes a plurality of user identification names, a plurality of user identification numbers, a plurality of user passwords, a plurality of device identification names, a plurality of device identification numbers, and a plurality of internet protocol addresses.

3. The method of claim 1, wherein the plurality of driver information includes a plurality of driver types and a driver version level associated with the first computer.

4. The method of claim 1, further comprising:
   initiating a plurality of data transactions between the first computer and the second computer.

5. The method of claim 1, wherein transmitting the driver update includes at least one of transmitting the driver update from the second computer to the first computer and denying a connection request from the first computer to the second computer.

6. The method of claim 1, wherein installing the driver update includes at least one of delivering the driver packet to a preconfigured location on the first computer, converting the driver packet to a preconfigured file extension, storing the converted driver packet to a preconfigured path, and delivering a structured query language (SQL) code to indicate a new driver version is available.

7. The method of claim 4, wherein each of the plurality of initiated data transactions has at least one of a time dimension, a numerical value, and a reference to one or more reference data objects.

8. A computer system for updating drivers, the computer system comprising:
   one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
      creating a connection handshake in a first computer in response to a connection request, wherein the connection handshake includes a plurality of client credentials and a plurality of driver information;
      in response to determining the first computer is authorized to connect to a second computer based on the plurality of client credentials, comparing, by the second computer, a first version level of a first plurality of drivers associated with the first computer to a second version level of a second plurality of drivers associated with the second computer based on the plurality of driver information; and
      transmitting a driver update from the second computer to the first computer as a byte array using a database protocol operating on the second computer regardless of whether the driver update is necessary.

9. The computer system of claim 8, wherein the plurality of client credentials includes a plurality of user identification names, a plurality of user identification numbers, a plurality of user passwords, a plurality of device identification names, a plurality of device identification numbers, and a plurality of internet protocol addresses.

10. The computer system of claim 8, wherein the plurality of driver information includes a plurality of driver types and a driver version level associated with the first computer.

11. The computer system of claim 8, further comprising:
   initiating a plurality of data transactions between the first computer and the second computer.

12. The computer system of claim 8, wherein transmitting the driver update includes at least one of transmitting the driver update from the second computer to the first computer and denying a connection request from the first computer to the second computer.

13. The computer system of claim 8, wherein installing the driver update includes at least one of delivering the driver packet to a preconfigured location on the first computer, converting the driver packet to a preconfigured file extension, storing the converted driver packet to a preconfigured path, and delivering a structured query language (SQL) code to indicate a new driver version is available.

14. The computer system of claim 11, wherein each of the plurality of initiated data transactions has at least one of a time dimension, a numerical value, and a reference to one or more reference data objects.

15. A computer program product for updating drivers, the computer program product comprising:
   one or more computer-readable tangible storage media and program instructions stored on at least one of the one or more tangible storage media, the program instructions executable by a processor capable of performing a method, the method comprising:
      creating a connection handshake in a first computer in response to a connection request, wherein the connection handshake includes a plurality of client credentials and a plurality of driver information;
      in response to determining the first computer is authorized to connect to a second computer based on the plurality of client credentials, comparing, by the second computer, a first version level of a first plurality of drivers associated with the first computer to a second version level of a second plurality of drivers associated with the second computer based on the plurality of driver information; and
      transmitting a driver update from the second computer to the first computer as a byte array using a database protocol operating on the second computer regardless of whether the driver update is necessary.

16. The computer program product of claim 15, wherein the plurality of client credentials includes a plurality of user identification names, a plurality of user identification numbers, a plurality of user passwords, a plurality of device identification names, a plurality of device identification numbers, and a plurality of internet protocol addresses.

17. The computer program product of claim 15, wherein the plurality of driver information includes a plurality of driver types and a driver version level associated with the first computer.

18. The computer program product of claim 15, further comprising:
   program instructions to initiate a plurality of data transactions between the first computer and the second computer.

19. The computer program product of claim 15, wherein transmitting the driver update includes at least one of transmitting the driver update from the second computer to the first computer and denying a connection request from the first computer to the second computer.

20. The computer program product of claim 15, wherein installing the driver update includes at least one of delivering the driver packet to a preconfigured location on the first computer, converting the driver packet to a preconfigured file extension, storing the converted driver packet to a preconfigured path, and delivering a structured query language (SQL) code to indicate a new driver version is available.

* * * * *